Jan. 25, 1966 LE ROY C. TILLOTSON 3,231,822

FREQUENCY MODULATION FEEDBACK RECEIVER

Filed Dec. 22, 1961

INVENTOR
L. C. TILLOTSON
BY [signature]
ATTORNEY 3,231,822
Patented Jan. 25, 1966

3,231,822

FREQUENCY MODULATION FEEDBACK RECEIVER

Le Roy C. Tillotson, Holmdel, N.J., assignor to Bell Telephone Laboratories, Incorporated, New York, N.Y., a corporation of New York Filed Dec. 22, 1961, Ser. No. 161,552
11 Claims. (Cl. 325—346)

Figure 1:
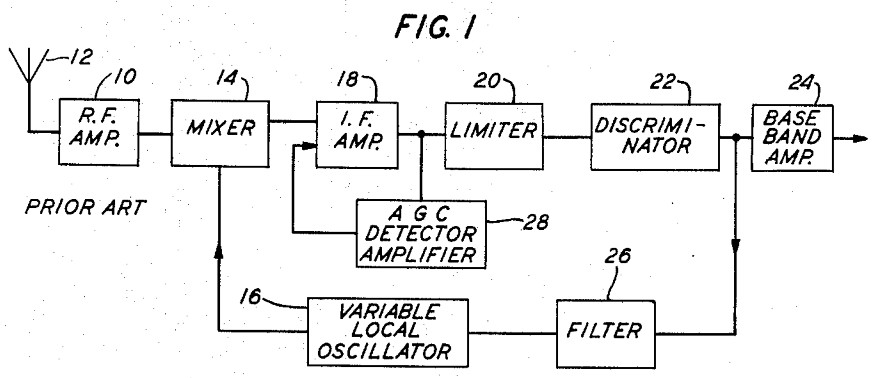

This invention relates to receivers for frequency modulation signals and more particularly to improvements in that class of frequency modulation receiver which has become known as the frequency modulation with feedback or frequency compression receiver.

One of the principal problems faced in the design of long-range communication systems involves the recovery of modulated signals of relatively low level from a high level of background noise which may result from sources either external to or within the receiver itself. It is well known that increases in the signal-to-noise ratio of the demodulated signal can be obtained only at the expense of an increase in radio frequency bandwidth required for the transmission of the communication signal. Frequency modulation, as normally practiced, represents one example of the trade between signal-to-noise performance and radio frequency bandwidth. A particular form of frequency modulation receiver which optimizes this exchange was disclosed by J. G. Chaffee in Patent 2,075,503, March 30, 1937, and is variously referred to as frequency modulation with feedback receiver or as a frequency compression demodulator. Briefly, in this type of receiver, the frequency of the local oscillator is caused by a feedback circuit to follow variations in the demodulated signal or baseband wave. This has the effect of reducing the modulation index at the input of the intermediate frequency amplifier and may, under some circumstances, improve the signal-to-noise performance of the receiver.

Attempts to employ the frequency modulation feedback principle in the design of useful receivers have indicated that the expected improvement in performance can be obtained only under specified circumstances. More recently and as taught in the copending application of L. H. Enloe, Serial No. 105,377, filed April 25, 1961, and assigned to the assignee of the present application, it has been found that the frequency modulation feedback receiver requires extreme care in design if the expected improvement in signal-to-noise performance is to be achieved. It has been shown that such a receiver is subject to two performance thresholds. One, common in all frequency modulation receivers, is caused by so-called limiter "breaking" which occurs when noise component amplitudes exceed the signal amplitude for any significant period of time, and the other is a threshold imposed by the nature of the feedback operation.

The mechanism contributing to the two thresholds, their interrelation, and the design of a receiver to permit optimum reduction in effective threshold, form the subject matter of the above-identified copending application. It is sufficient to say that the performance of the frequency modulation feedback receiver for an input radio frequency signal of a given carrier-to-noise ratio is optimized when the two thresholds occur substantially simultaneously. Further, this result follows when the closed loop bandwidth of the feedback portion of the receiver is made as narrow as possible. This, in turn, is accomplished through the use of an open loop transfer function which is determined by the use of an intermediate frequency amplifier having the characteristic of a single tuned circuit and a noise bandwidth not quite as great as the closed loop bandwidth, additional filtering elements located in the feedback loop restricting the open loop characteristic to a bandwidth equal to that of the modulation signals to be recovered. The term "baseband" may be used hereinafter to refer to this band of signals which is to be transmitted over the system and recovered at the receiver. The baseband may be the audio frequency band, the video frequency band, or any other band of signals which it is desired to transmit. .

It will be noted that the design criteria for the optimum frequency modulation feedback receiver are chosen with reference to a given input carrier-to-noise ratio. In certain communication systems, such as those where mutual visibility of the transmitting and receiving stations may be variable, or where, as in satellite communications, tracking errors and tropospheric attenuation are variable, the carrier-to-noise ratio at the input of the receiver is not a fixed quantity.

It is accordingly the object of the present invention to adapt the frequency modulation with feedback receiver to achieve optimum improvement in performance for incoming radio frequency signals subject to variation in the available carrier-to-noise ratio.

To this end and in accordance with the invention, the frequency modulation feedback receiver comprises a main signal path including a radio frequency section, a mixer with local oscillator, an intermediate frequency section, a frequency modulation detector, and a baseband section. A feedback path is provided for applying the signal in the baseband section to control the frequency of the local oscillator, together with means for detecting the level of the received carrier and adjusting the parameters of the feedback loop and/or those of the baseband section in proportion to the level of the received carrier.

Thus at low carrier-to-noise ratios, the minimum threshold can be obtained as in previous frequency modulation feedback receivers. When the carrier-to-noise ratio of the received signal increases, the low threshold is exceeded and the full capability of the frequency modulation feedback receiver to reduce the threshold is no longer required. At these times the bandwidth of the receiver is increased automatically. The additional bandwidth thus made available results in improved definition in picture signals and reduction in intermodulation distortion in multiplexed voice signals.

Figure 2:
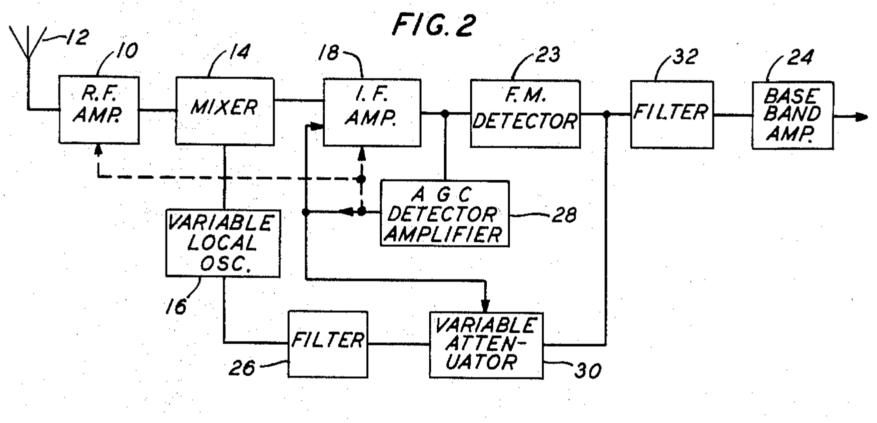
Figure 3:
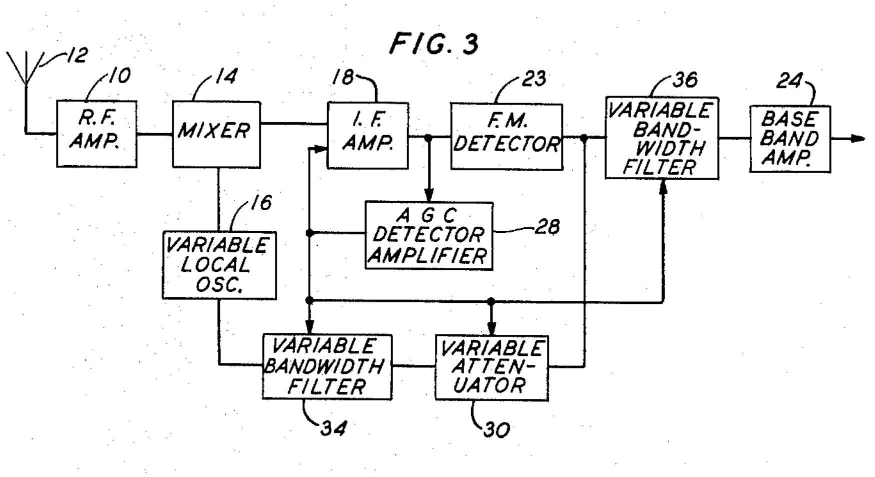

The above and other features of the invention will be considered in detail in the following specification, taken in connection with the drawing in which:

FIG. 1 is a block schematic diagram referred to as the prior art and representing the frequency modulation feedback receivers of the Chaffee patent and the Enloe application referred to above;

FIG. 2 is a block schematic diagram illustrating a modification of the prior art receivers wherein, according to the invention, the pass band of at least one filter in the feedback loop and/or the level of the feedback signal are modified as a function of the incoming carrier signal; and FIG. 3 is a block schematic diagram of another embodiment of the invention wherein parameters, both within and without the feedback loop of the frequency modulation feedback receiver, are modified in accordance with the level of the incoming radio frequency carrier.

Basically, the Enloe application teaches that the optimum performance of a frequency modulation feedback receiver is attained by restricting the closed loop bandwidth of the feedback loop to as low a value as possible without causing high index noise modulation of the local variable beating oscillator. These criteria, which result in matching the limiter breaking threshold and the feedback threshold of the receiver, require that the signal appearing at the output of the frequency detector be of a bandwidth considerably greater than the bandwidth of the signals which it is desired to recover at baseband frequencies. Even though necessarily restricted to obtain the lowest possible threshold, the closed loop bandwidth of the frequency modulation receiver exceeds the baseband signal bandwidth. Accordingly, a filter is added in the baseband section of the receiver to limit the ultimate output signal to the band of frequencies in which the desired signal occurs and to reject to the greatest degree possible the high frequency noise components inherently present in the triangular noise spectrum associated with frequency modulation transmission. Such a baseband filter is required whether or not frequency modulation with feedback is employed. However, when frequency modulation with feedback is employed, a lower effective threshold is attained. It is the preservation of this lower threshold, when usable, and the optimization of receiver performance, when this low threshold is not required, to which the present invention is directed.

FIG. 1 represents prior frequency modulation feedback receivers which may, as shown, comprise a radio frequency amplifier 10, associated with an antenna 12 and supplying an amplified version of an incoming signal to a conventional mixer 14. In the mixer 14, the incoming signal is combined with the output of a local oscillator 16 to yield an intermediate frequency signal which is applied to and amplified in an intermediate frequency amplifier section 18. Typically, the intermediate frequency amplifier includes band-limiting or restricting filter elements which control the transmission characteristic to afford a desired input-output performance. The intermediate frequency signal is applied to a limiter 20 in the usual fashion to remove amplitude variations and the limited signal is applied to a discriminator or frequency modulation detector 22. The output of discriminator 22 is applied to a baseband amplifier 24 to yield the desired information-bearing signal. As taught in the Chaffee patent and the Enloe application, a sample of the output of the discriminator is applied by way of a filter 26 to control the frequency of local oscillator 16, thus providing so-called frequency modulation feedback. As stated above and in accordance with the Enloe application, the choice of the filter characteristic of intermediate frequency amplifier 18 and that of filter 26 is made in such a way as to optimize the performance of the receiver (by providing the lowest possible threshold) for a given incoming signal-to-noise ratio. When ample signal level, as indicated by an increased carrier-to-noise ratio, is available, however, the full or at least a greater part of the closed loop bandwidth may be utilized to contribute to the baseband signal output. Further, under these circumstances, the closed loop bandwidth itself need not be so restricted and may be increased without incurring any significant noise penalty at the output. These changes in the frequency modulation feedback receiver make possible the transmission and recovery of a broader baseband when available signal level at the input to the receiver is sufficiently high. According to the present invention, the over-all feedback characteristic (and thus the closed loop bandwidth) and/or the pass band of the baseband filter may be modified to account for variations in the incoming radio frequency signal and particularly in accordance with variations in the carrier level of that signal.

FIG. 2 illustrates one embodiment of the present invention and indicates how the receiver of FIG. 1 may be modified to achieve improved performance when adequate incoming carrier-to-noise ratio is available. To this end, the transmission characteristic of the intermediate frequency amplifier may be modified and, in addition, the amount of feedback, that is, the level of the feedback signal, may also be appropriately modified. FIG. 2 of the drawing includes the elements previously discussed in connection with FIG. 1, which are identified by the same reference characters where applicable, it being assumed, however, that limiter 20 and discriminator 22 together form the frequency modulation detector 23 of FIG. 2. The basic approach of the invention is to modify the pass band of intermediate frequency amplifier 18 and/or to adjust a variable attenuator 30 connected in the feedback loop between frequency modulation detector 23 and filter 26 to reflect changes in the level of the incoming carrier. More particularly, it is intended to adjust the bandwidth of the intermediate frequency amplifier 18 and/or the level of the signal fed back to modify the closed loop bandwidth of the feedback loop in direct proportion to changes in the received carrier power; that is, the greater the received carrier power, the greater the closed loop bandwidth can become without causing the threshold to exceed the available signal level at the frequency detector. Obviously, any adjustment in the feedback loop may be employed to affect the closed loop bandwidth. FIG. 2 illustrates two convenient methods of accomplishing the desired adjustment which may be used independently or in concert. In either event, an automatic gain control detector 28 provides, in the usual fashion, an output signal which is the measure of the level of the received carrier. Conveniently this signal is employed to vary the gain of the radio frequency or intermediate frequency amplifiers, as indicated by the dashed lines in FIG. 2. This control signal may also be used to vary the pass band of intermediate frequency amplifier 18 as, for example, by adjusting the impedance of a shunt element in the filter circuits thereof. The various ways in which such an adjustment can be accomplished are well known and may include a servo-like system in which the output of the automatic gain control detector is employed to adjust a variable potentiometer which forms a portion of the filter or, in the alternative, one or more of the filter elements may comprise an active element, such as a transistor, the impedance of which may be varied directly by a control signal.

The control signal from automatic gain control detector 28 may, in the alternative, adjust the impedance of variable attenuator 30 which, in turn, controls the feedback factor directly. Here again, a servo control system may be used or the variable attenuator may comprise a variolosser made up of a number of solid-state diode elements and introducing an impedance controlled by the bias signals applied to the diode element. Where variation of the pass band of intermediate frequency amplifier 18 or of attenuator 30 in the feedback path is employed, or where two parameters are varied together, the aim is to adjust the closed loop bandwidth as a function of the incoming carrier level, since it is unnecessary to achieve the exceptionally low threshold of the frequency modulation receiver so long as adequate carrier-to-noise ratio is available at the radio frequency portion of the receiver.

FIG. 3 of the drawing illustrates another embodiment of the invention. Here, as in FIG. 2, like reference characters identify the same basic elements of the frequency modulation receiver. Two modifications, however, are apparent. First, the filter at the input of variable local oscillator 16 is itself made of variable bandwith and is identified in FIG. 3 as 34 and, second, the baseband filter 32 is replaced by a variable bandwidth filter 36. Both filters 34 and 36 are adjustable in characteristic in the same manner as discussed in connection with the intermediate frequency amplifier 18 of FIG. 2. In fact, and as shown in FIG. 3, the filter characteristics of intermediate frequency amplifier 18, feedback filter 34, and baseband filter 36, as well as the attenuation of variable attenuator 30 are all adjusted in accordance with the control signal from the automatic gain control detector 28 which is, in turn, proportional to the level of the received radio frequency carrier. As in the case of the embodiment of FIG. 2, all of these variable parameters may be adjusted together or any combination of these parameters may be employed to improve the performance of the receiver when signals of variable effective carrier-to-noise ratio are encountered. The first three variable elements perform in the manner indicated above to adjust the feedback loop modifying the closed loop bandwidth of the feedback portion of the receiver.

Variable bandwidth filter 36, however, operates in a somewhat different manner to improve the performance of the receiver and may advantageously be employed with or without modification of the feedback loop parameters to enhance the receiver performance by eliminating, insofar as possible, the high freqeuncy components of noise which appear in the triangular noise spectrum of the frequency modulation signal. In particular, and in accordance with the invention, it is recognized that the closed loop bandwidth of the frequency modulation feedback receiver must necessarily exceed that band required for accommodation of the signals which it is desired to recover. Thus, there appears at the output of frequency modulation detector 23, a considerably broader band of frequencies than those encompassed in the baseband signal which it is desired to recover. Accordingly, when the receiver is operating near threshold, the bandpass of filter 36 may be advantageously adjusted to cause rejection of those signal components which lie at the baseband of frequencies. Thus, the high frequency noise components inherent in frequency modulation transmission are discriminated against and effectively reduced. When the available carrier-to-noise ratio at the receiver increases, the threshold is exceeded and a greater band of frequencies can be recovered without degradation by noise. If the pass band of the baseband filter is increased, video signals providing greater picture definition may be accommodated. If adjustment of baseband filter 36 is accomplished concurrently with increase in the closed loop bandwith, the two improvements in receiver performance complement each other to achieve optimum compensation for variations in the level of the incoming signal wave.

Although the already available automatic gain control circuitry has been shown as the source of signals for controlling the variable parameters of the receiver, there may be cases in which variations in the level of the incoming signal can be predicted. This could occur, for example, in satellite communication systems in which the orbits of repeater stations and the effect of movement of the repeaters in these orbits can be calculated in advance. In such circumstances, it may be desirable to program variations in the receiver parameters in advance and to control the required adjustments by data recorded in punched tapes or stored on magnetic tapes.

What is claimed is:

1. In a receiver for frequency modulated waves, a variable frequency local oscillator, means for combining the output of said local oscillator and said frequency modulated waves to produce an intermediate frequency signal, means for amplifying and demodulating said intermediate frequency signal, feedback means including a frequency restrictive element for applying a portion of the demodulated signal to produce corresponding variations in the frequency of said local oscillator, and means for varying the closed loop bandwith of the feedback circuit as a function of the level of the applied frequency modulated waves.

2. In a receiver for frequency modulated waves, a variable frequency local oscillator, means for combining the output of said local oscillator and said frequency modulated waves to produce an intermediate frequency signal, means for demodulating said intermediate frequency signal, a feedback circuit including a frequency restrictive element and a variable attenuator for applying a portion of the demodulated signal to produce corresponding variations in the frequency of said local oscillator, and means for varying said attenuator to alter the level of the signal fed back to said local oscillator in direct proportion to the level of the received frequency modulated waves.

3. In a receiver for frequency modulated waves, a variable frequency local oscillator, means for combining the output of said local oscillator and said frequency modulated waves to produuec an intermediate frequency signal, means for demodulating said intermediate frequency signal, feedback means including a frequency restrictive element for applying a portion of the demodulated signal to produce corresponding variations in the frequency of said local oscillator, and means for varying the pass band of said frequency restrictive element as a function of the level of the applied frequency modulated waves.

4. In a receiver for frequency modulated waves, a variable frequency local oscillator, means for combining the output of said local oscillator and said frequency modulated waves to produce an intermediate frequency signal, means for amplifying said intermediate frequency signal, means for demodulating the amplified intermediate frequency signal, feedback means including a frequency restrictive element for applying a portion of the demodulated signal to produce corresponding variations in the frequency of said local oscillator, and means for varying the pass band of the intermediate frequency amplifier in direct proportion to the level of the applied frequency modulated waves.

5. In a receiver for frequency modulated waves, a variable frequency local oscillator, means for combining the output of said local oscillator and said frequency modulated waves to produce an intermediate frequency signal, means for demodulating said intermediate frequency signal, feedback means including a frequency restrictive element for applying a portion of the demodulated signal to produce corresponding variations in the frequency of said local oscillator, means for detecting changes in the level of the carrier of the received frequency modulated waves, and means for varying closed loop bandwidth of the feedback means as a function of the level of said carrier.

6. In a receiver for frequency modulated waves, a variable frequency local oscillator, means for combining the output of said local oscillator and said frequency modulated waves to produce an intermediate frequency signal, means for amplifying said intermediate frequency signal, means for demodulating said intermediate frequency signal and a feedback loop circuit for applying a portion of the demodulated signal to produce corresponding variations in the frequency of said local oscillator and including the intermediate frequency amplifier, an attenuator, and a frequency restrictive element other than said intermediate frequency amplifier, and means for varying the transmission characteristic of at least one of the elements of said feedback loop to vary the closed loop bandwidth of the loop as a function of the level of applied frequency modulated waves.

7. In a receiver for frequency modulated waves, a variable frequency local oscillator, means for combining the output of said local oscillator and said frequency modulated waves to produce an intermediate frequency signal, means for amplifying said intermediate frequency signal, means for demodulating said intermediate frequency signal, feedback means for applying a portion of the demodulated signal to produce corresponding variations in the frequency of said local oscillator, said means including in loop circuit the local oscillator, the combining means, the intermediate frequency amplifier, the demodulator, an attenuator, and a frequency restrictive element, means for varying the transmission characteristic of at least one of the elements of said loop circuit to adjust the closed loop bandwidth of the loop as a function of the level of applied frequency modulated waves, a filter at the output of said demodulator for limiting the frequency band of the demodulated waves to a nominal value equal to that of the band of signals to be transmitted, and means for varying the bandwidth of said last-mentioned filter in accordance with variations in the closed loop bandwidth of said feedback loop.

8. In a receiver for frequency modulated waves, a variable frequency local oscillator, means for combining the output of said local oscillator and said frequency modulated waves to produce an intermediate frequency signal, an amplifier for said intermediate frequency signal, means for demodulating said intermediate frequency signal, feedback means for applying a portion of the demodulated signal to produce corresponding variations in the frequency of said local oscillator, automatic gain control means responsive to the carrier level of said frequency modulated waves to maintain the amplitude of said intermediate frequency signal substantially constant, and means for adjusting the closed loop bandwidth of the feedback loop in proportion to the output of said automatic gain control means.

9. In a demodulator for frequency modulation signals, a loop circuit including in the order named a mixer, a first frequency restrictive element, a frequency detector, a second frequency restrictive element and a source of oscillations of controllable frequency, said first frequency restrictive element comprising a filter having the characteristic of a single tuned circuit and a bandwidth less than the closed loop bandwidth of said loop circuit and the second frequency restrictive element limiting the open loop bandwidth to that of the modulation signals to be recovered, means for applying signals to be demodulated to said mixer, means for abstracting demodulated signals from said frequency detector, and means for varying the transmission pass band of said first frequency restrictive element as a function of the level of said signals to be demodulated.

10. In a demodulator for frequency modulation signals, a loop circuit including in the order named a mixer, a first frequency restrictive element, a frequency detector, a second frequency restrictive element and a source of oscillations of controllable frequency, said first frequency restrictive element comprising a filter having the characteristic of a single tuned circuit and a bandwidth less than the closed loop bandwidth of said loop circuit and the second frequency restrictive element limiting the open loop bandwidth to that of the modulation signals to be recovered, means for applying signals to be demodulated to said mixer, means for abstracting demodulated signals from said frequency detector, and means for varying the pass band of said second frequency restrictive element to adjust the closed loop bandwidth of said loop circuit in proportion to the carrier level of said signals to be demodulated.

11. In a demodulator for frequency modulation signals, a loop circuit including in the order named a mixer, a first frequency restrictive element, a frequency detector, a second frequency restrictive element and a source of oscillations of controllable frequency, said first frequency restrictive element comprising a filter having the characteristic of a single tuned circuit and a bandwidth less than the closed loop bandwidth of said loop circuit and the second frequency restrictive element limiting the open loop bandwidth to that of the modulation signals to be recovered, means for aplying signals to be demodulated to said mixer, means for abstracting demodulated signals from said frequency detector, and means responsive to the level of the carrier of said signals to be demodulated for adjusting the pass band of at least one of said first and second frequency restrictive elements to vary the closed loop bandwidth of said loop circuit in direct proportion to the level of said carrier.

References Cited by the Examiner

UNITED STATES PATENTS

| | | | |
|---|---|---|---|
| 1,807,940 | 6/1931 | Stafford | 333—28 |
| 2,844,713 | 7/1958 | Zuckerman | 325—346 |
| 2,929,926 | 3/1960 | Fibranz | 325—400 |
| 2,969,459 | 1/1961 | Hern | 325—344 |
| 2,989,622 | 6/1961 | Doherty | 325—346 |

DAVID G. REDINBAUGH, *Primary Examiner.*